United States Patent
Lee (10) Patent No.: US 8,681,374 B2
(45) Date of Patent: Mar. 25, 2014

(54) IMAGE FORMING APPARATUS AND AUTO COLOR REGISTRATION METHOD THEREOF

(75) Inventor: Kwon-cheol Lee, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 491 days.

(21) Appl. No.: 12/824,730

(22) Filed: Jun. 28, 2010

(65) Prior Publication Data

US 2011/0085187 A1 Apr. 14, 2011

(30) Foreign Application Priority Data

Oct. 14, 2009 (KR) .................. 10-2009-0097943

(51) Int. Cl.
*H04N 1/46* (2006.01)
*H04N 1/00* (2006.01)
*G06K 15/02* (2006.01)

(52) U.S. Cl.
CPC ...................................... *G06K 15/02* (2013.01)
USPC ............ 358/1.9; 358/406; 358/504; 399/298; 399/301

(58) Field of Classification Search
USPC .......... 358/1.9, 2.1, 504, 406; 399/66, 74, 49, 399/298, 301
See application file for complete search history.

(56) References Cited

U.S. PATENT DOCUMENTS

| | | | | |
|---|---|---|---|---|
| 3,762,791 | A * | 10/1973 | Fournier et al. | 359/201.1 |
| 7,197,256 | B2 * | 3/2007 | Nishizaki | 399/66 |
| 7,296,746 | B2 * | 11/2007 | Philyaw et al. | 235/462.01 |
| 2003/0175049 | A1 * | 9/2003 | Ichida et al. | 399/237 |
| 2004/0109708 | A1 * | 6/2004 | Kobayashi et al. | 399/301 |
| 2008/0064596 | A1 * | 3/2008 | Iino et al. | 503/201 |
| 2009/0027703 | A1 * | 1/2009 | Kim et al. | 358/1.9 |
| 2009/0168619 | A1 * | 7/2009 | Gotoh et al. | 369/47.15 |
| 2009/0297200 | A1 * | 12/2009 | Takezawa et al. | 399/74 |
| 2010/0303490 | A1 * | 12/2010 | Ozeki | 399/49 |
| 2010/0303514 | A1 * | 12/2010 | Ishii et al. | 399/301 |

* cited by examiner

Primary Examiner — Jerome Grant, II
(74) Attorney, Agent, or Firm — Stanzione & Kim, LLP (57) ABSTRACT

An image forming apparatus and an auto color registration method thereof. The automatic color registration method of the image forming apparatus, the method includes transferring a plurality of first patterns synchronized with a phase of an image receptor, detecting the transferred first patterns, and performing an automatic color registration (ACR) by controlling a driving speed of the image receptor based on the detected first pattern. With this, the apparatus and method controls a driving speed of an image receptor by using a pattern synchronized with a phase of the image receptor and improves accuracy of the ACR.

27 Claims, 8 Drawing Sheets

FIG. 8

US 8,681,374 B2

IMAGE FORMING APPARATUS AND AUTO COLOR REGISTRATION METHOD THEREOF

CROSS-REFERENCE TO RELATED APPLICATIONS

This application claims priority under 35 U.S.C. 119(a) from Korean Patent Application No. 10-2009-0097943, filed on Oct. 14, 2009, in the Korean Intellectual Property Office, the disclosure of which is incorporated herein by reference in its entirety.

BACKGROUND

1. Field of the Invention

Apparatuses and methods of the present general inventive concept relate to an image forming apparatus and an auto color registration method thereof, and more particularly, to an image forming apparatus and an auto color registration method thereof to control a driving rate of an organized photo conductor and to improve accuracy of auto color registration.

2. Description of the Related Art

An image forming apparatus including a printer, a multi-function device and a scanner forming a color image includes an image forming unit including a plurality of exposure units i.e., a light scanning unit (LSU) provided corresponding to a plurality of colors, and a plurality of image receptors i.e., organized photo conductors (OPCS). The plurality of image receptors is arranged along a moving path of a print medium moved by a moving means such as a transfer belt.

To print an accurate color image, a starting point and an ending point for transferring an image should be consistent for all of the plurality of colors. Thus, the image forming apparatus performs an auto color registration (hereinafter, to be also called ACR). The ACR means a job which examines whether an image in each color is accurately registered in the transfer belt and adjusts the image automatically upon occurrence of error.

The image forming apparatus detects a plurality of patterns transferred on the transfer belt corresponding to a plurality of colors, and performs the ACR with respect to the color which is out of a registration location. More specifically, the image forming apparatus measures an X offset and an Y offset by using a distance between the plurality of detected patterns, and performs the ACR to register the position of the patterns with respect to the plurality of colors by using the measured X offset and Y offset.

Meanwhile, the image receptor and a gear which drives the image receptor are generally asymmetric. Thus, jitter or slip may occur from the transfer belt or the image receptor.

As the ACR is performed based on the location information having errors due to the jitter or slip, the ACR adjustment may be less accurate.

SUMMARY

Accordingly, example embodiments of the present general inventive concept may provide an image forming apparatus and an auto color registration method thereof to control a driving speed of an organized photo conductor by using a pattern synchronized with a phase of the organized photo conductor and to improve accuracy of an auto color registration.

Example embodiments of the present general inventive concept may also provide an image forming apparatus and an auto color registration method thereof to minimize jitter, slip or weaving of a transfer belt adversely affecting accuracy of an auto color registration (ACR) and to improve reliability of the ACR.

Additional features and/or advantages of the present invention will be set forth in part in the description which follows and, in part, will be obvious from the description, or may be learned by practice of the present invention.

Example embodiments of the present general inventive concept may also provide an automatic color registration method of an image forming apparatus, the method including transferring a plurality of first patterns synchronized with a phase of an image receptor, detecting the transferred first patterns, and performing an automatic color registration (ACR) by controlling a driving speed of the image receptor based on the detected first pattern.

The performing the ACR may include controlling a driving speed at one or more blocks of the image receptor to maintain a distance between the plurality of first patterns.

The detecting the transferred first pattern may include comparing the distance between the plurality of first patterns and reference data, and the performing the ACR may include controlling a driving speed at the one or more of the image receptor to make the distance between the first patterns be consistent with the reference data.

The transferred first patterns may include a plurality of bar patterns.

The transferring the first patterns may include transferring a second pattern a plurality of times corresponding to a predetermined color, and the detecting the first patterns includes detecting the transferred second pattern.

The performing the ACR may include performing the ACR by controlling a scanning period of a plurality of exposure units corresponding to the plurality of colors based on the second pattern.

The second pattern may include a bar pattern and a slant pattern which are spaced from each other at one end and contact each other at the other end.

The method may further include measuring an X offset and an Y offset by using a distance between the second patterns, wherein the performing the ACR may include performing the ACR to register a position of the second patterns with respect to the plurality of colors by using the measured X offset and the Y offset.

The first and second patterns may be transferred corresponding to colors of cyan (C), magenta (M), yellow (Y) and black (K).

Example embodiments of the present general inventive concept may also provide an image forming apparatus, including a moving unit having a transfer belt, an image forming unit which includes a plurality of image receptors to transfer first patterns to the transfer belt corresponding to a plurality of colors, a detector having an image receptor speed sensor to detect the transferred first pattern and an image receptor sync sensor to detect a phase of the image receptor, and a controller to control the image receptors to transfer the plurality of first patterns synchronized with the phase of the image receptors according to a detection result of the image receptor sync sensor, and to control a driving speed of the image receptors based on the detected first pattern to perform the ACR.

The controller may control a driving speed at one or more blocks of the image receptors to maintain a distance between the plurality of first patterns.

The image forming apparatus may include a storage unit to store therein reference data on the distance between the plurality of first patterns, wherein the controller may compare the detected distance between the plurality of first patterns, and control a driving speed at each block of the image receptors to make the distance between the first patterns be equal to that of the reference data.

The first patterns may include a plurality of bar patterns.

The image receptors may transfer second patterns a plurality of times corresponding to a predetermined color, and the detector may further include an ACR sensor to detect the transferred second pattern.

The image forming unit may further include a plurality of exposure units corresponding to the plurality of colors, and the controller may control a scanning period of the plurality of exposure units according to the second patterns to perform the ACR.

The second patterns may include a bar pattern and a slant pattern which are spaced from each other at one end and contact each other at the other end.

The controller may measure an X offset and an Y offset by using a distance between the detected second patterns, and performs the ACR to register a position of the second patterns with respect to a plurality of colors by using the measured X offset and the Y offset.

The first patterns and the second patterns may be transferred corresponding to colors of cyan (C), magenta (M), yellow (Y) and black (K).

Example embodiments of the present general inventive concept may also provide a method of performing automatic color registration (ACR) in an image forming apparatus, the method including synchronizing a phase of an organized photoconductor with at least one pattern, and controlling the driving speed of an image receptor in the image forming apparatus with the at least one pattern that is synchronized with the phase.

The method may include controlling the driving speed at one or more blocks of the organized photoconductor to maintain a distance between the patterns.

The method may include where the at least one pattern is detected with a detector of the image forming apparatus.

The method may include where the at least one pattern is detected by comparing the distance between the patterns and reference data.

The method may include controlling the driving speed at the one or more blocks of the organized photoconductor such that the distance between the patterns is equal to that of the reference data.

The method may include where the at least one pattern is a bar pattern.

The method may include detecting at least one pattern that corresponds to a predetermined color with a detector of the image forming apparatus.

The method may include controlling a scanning period of a plurality of exposure units of the image forming apparatus corresponding to the detected at least one pattern corresponding to the predetermined color.

Example embodiments of the present general inventive concept also provide an image forming apparatus, including a controller to synchronize a phase of an organized photoconductor with at least one pattern, and to control the driving speed of an image receptor in the image forming apparatus with the at least one pattern that is synchronized with the phase.

Example embodiments of the present general inventive concept also provide an image forming apparatus, including an image forming unit to form a first pattern and a second pattern, a detector to detect the first pattern and the second pattern, and a controller to control different characteristics of the image forming unit according to the detected first pattern and the detected second pattern.

The apparatus may also include where the image forming unit has an image receptor and an exposure unit, and the different characteristics include a speed of the image receptor and scanning a period of the exposure unit.

BRIEF DESCRIPTION OF THE DRAWINGS

The above and/or other features and utilities of the present invention will become apparent and more readily appreciated from the following description of the example embodiments, taken in conjunction with the accompanying drawings of which.

DETAILED DESCRIPTION OF THE EMBODIMENTS

Hereinafter, exemplary embodiments of the present general inventive concept will be described with reference to accompanying drawings, wherein like numerals refer to like elements and repetitive descriptions will be avoided as necessary.

Figure 1:
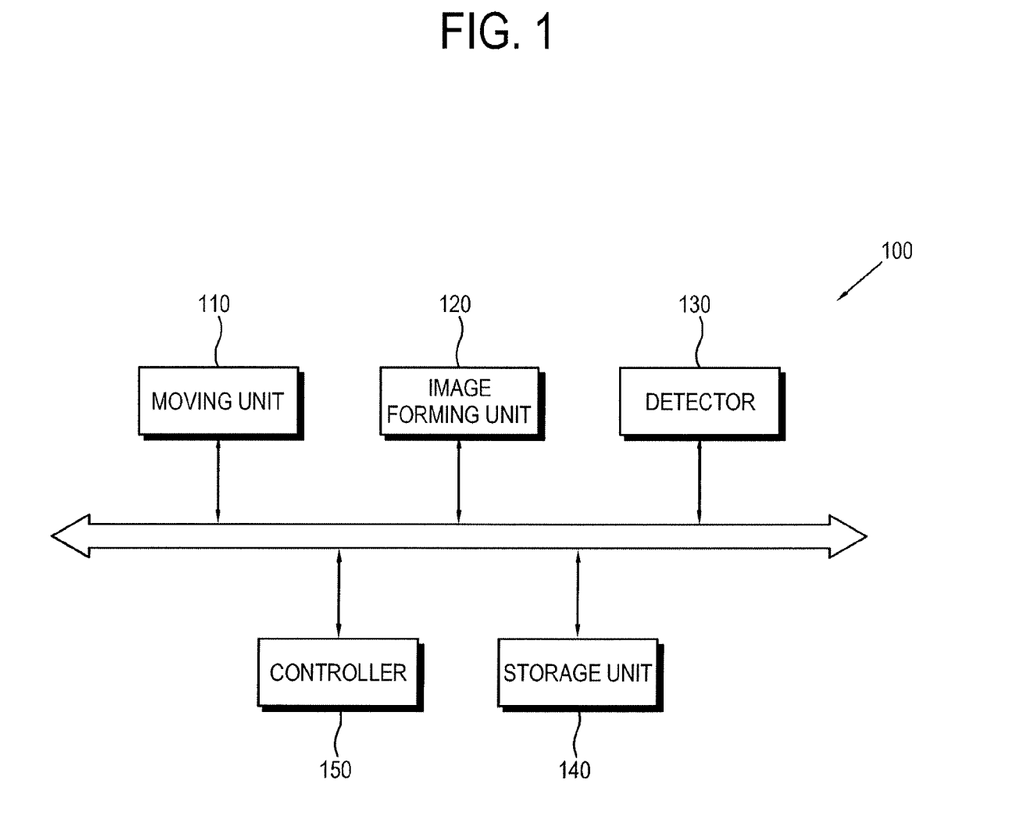
FIG. 1 is a block diagram illustrating an image forming apparatus according to exemplary embodiments of the present general inventive concept.
Figure 2:
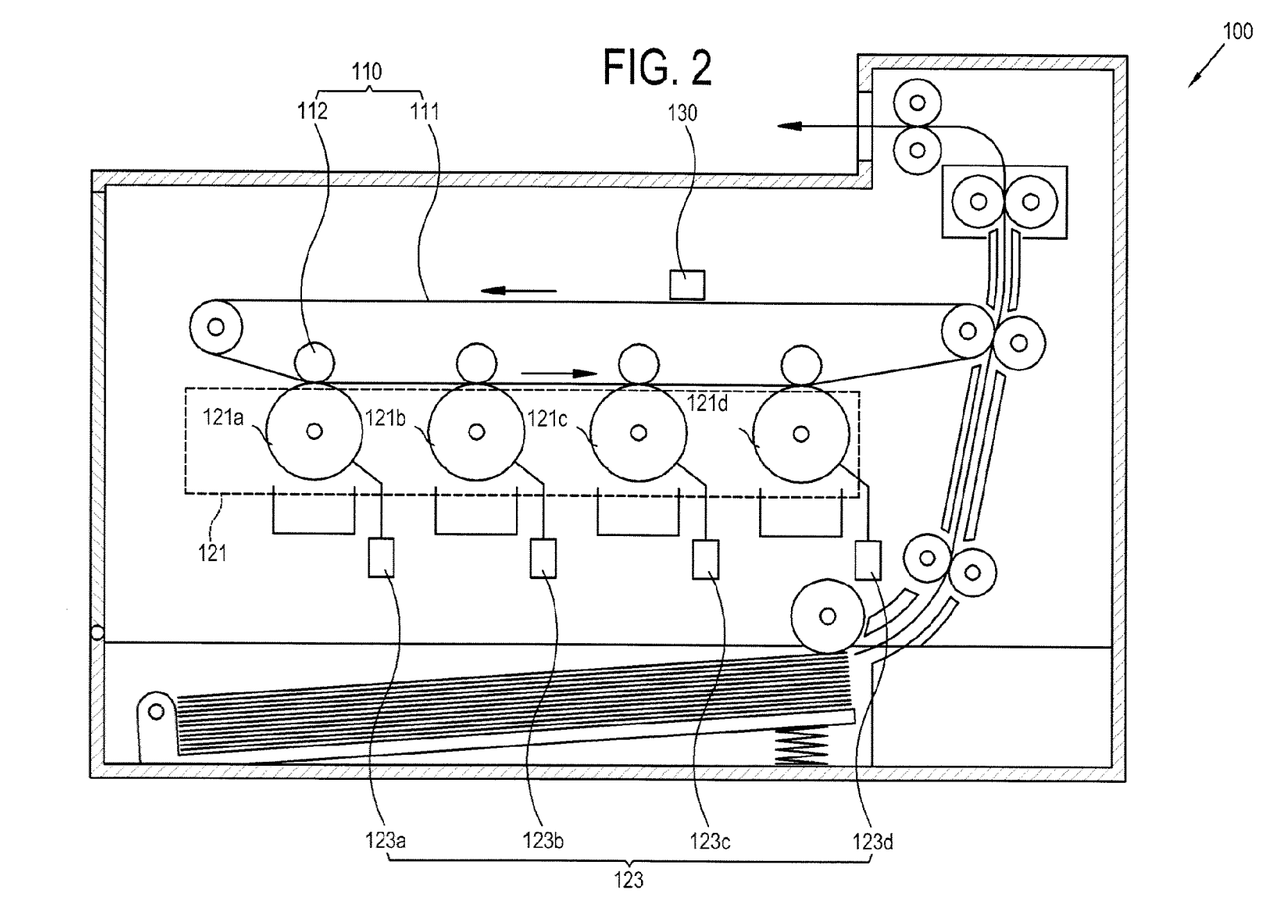
FIG. 2 is a sectional view illustrating the image forming apparatus according to exemplary embodiments of the present general inventive concept.

FIG. 1 is a block diagram illustrating an image forming apparatus 100 according to exemplary embodiments of the present general inventive concept. FIG. 2 is a sectional view illustrating the image forming apparatus 100 according to the exemplary embodiments of the present general inventive concept.

The image forming apparatus 100 may include a printer, a photocopier, a facsimile, a multi-function device which has at least two functions, etc.

The image forming apparatus 100 according to exemplary embodiments of the present general inventive concept can be a single pass type to print a plurality of colors at the same time, and can include a direct transfer and an indirect transfer as a transfer type. That is, the plurality of colors may be printed by direct transfer or indirect transfer to a print medium.

As illustrated in FIGS. 1 and 2, the image forming apparatus 100 includes a moving unit 110, an image forming unit 120, a detector 130, a storage unit 140 and a controller 150.

The moving unit 110 can move an image developed by the image forming unit 120 or a print medium having an image formed thereof according to a control (e.g., one or more control signals) of the controller 150. The moving unit 110 can include a transfer belt 111 and a moving roller 112 to move the transfer belt 111 to thereby move an image or a print medium (not illustrated) having an image formed thereon.

As illustrated in FIG. 2, the print medium can be moved in a predetermined direction by the transfer belt 111 (hereinafter, to be also called "print medium moving path"). That is, the transfer belt 111 can move corresponding to the print medium moving path (e.g., as illustrated by the directional arrows in FIG. 2).

The transfer belt 111 according to the present general inventive concept can include a paper transfer belt (PTB) and an intermediate transfer belt (ITB).

The image forming unit 120 can form an image to be printed on at least one print medium (e.g., recording medium, or paper, or any other suitable medium to carry out the exemplary embodiments of the present general inventive concept) according to print data upon reception of a print command. The print operation can include a print operation to copy a scanned document, a print operation for received fax data, and a print operation for print data received from the outside through a host apparatus (e.g., a computer server, or other apparatus (not illustrated) communicatively coupled to the image forming apparatus) including a server or print data stored in an inside (hard disk drive) or outside (USB memory stick) of the image forming apparatus 100.

More specifically, the image forming unit 120 can perform exposure (including light scanning), developing and transferring operations to form an image according to print data and transfer a developer (e.g., toner) on a print medium.

As illustrated in FIG. 2, the image forming unit 120 can include a plurality of exposure units 123 (hereinafter, to be also called "laser scanning units (LSUs)"—LSUs 123a to 123d) and a plurality of image receptors 121 (hereinafter, to be also called "organized photo conductors (OPCs)"—OPCs 121a to 121d) which are provided corresponding to a plurality of colors, e.g., four colors of cyan (C), magenta (M), yellow (Y) and black (K).

The plurality of LSUs 123a to 123d can scan light to form a plurality of patterns on the plurality of OPCs 121a to 121d to perform an auto color registration (ACR). The plurality of OPCs 121a to 121d can form an electrostatic latent image by reacting to light scanned by the LSUs 123a to 123d.

The electrostatic latent image which is formed on a surface of the plurality of OPCs 121a to 12d can be developed into a visual image by a toner, and can be transferred to the transfer belt 111.

The plurality of patterns may corresponding to C, M, Y and K, and may be formed corresponding to at least four colors according to the colors of the image forming unit 120.

More specifically, the image forming unit 120 may have six, eight or nine colors. For example, if the image forming unit 120 has six colors, a plurality of patterns (six patterns) is formed corresponding to C, M, Y, K and light cyan (Lc) and light magenta (Lm). If the image forming unit 120 has eight colors, it may form a plurality of patterns corresponding to C, M, Y, K, Lc, Lm, green (Gr) and orange (Or). If the image forming unit 120 has nine colors, it may form a plurality of patters corresponding to C, M, Y, K, Lc, Lm, photo blue (B), light gray (Lg) and dark gray (G).

Figure 3:
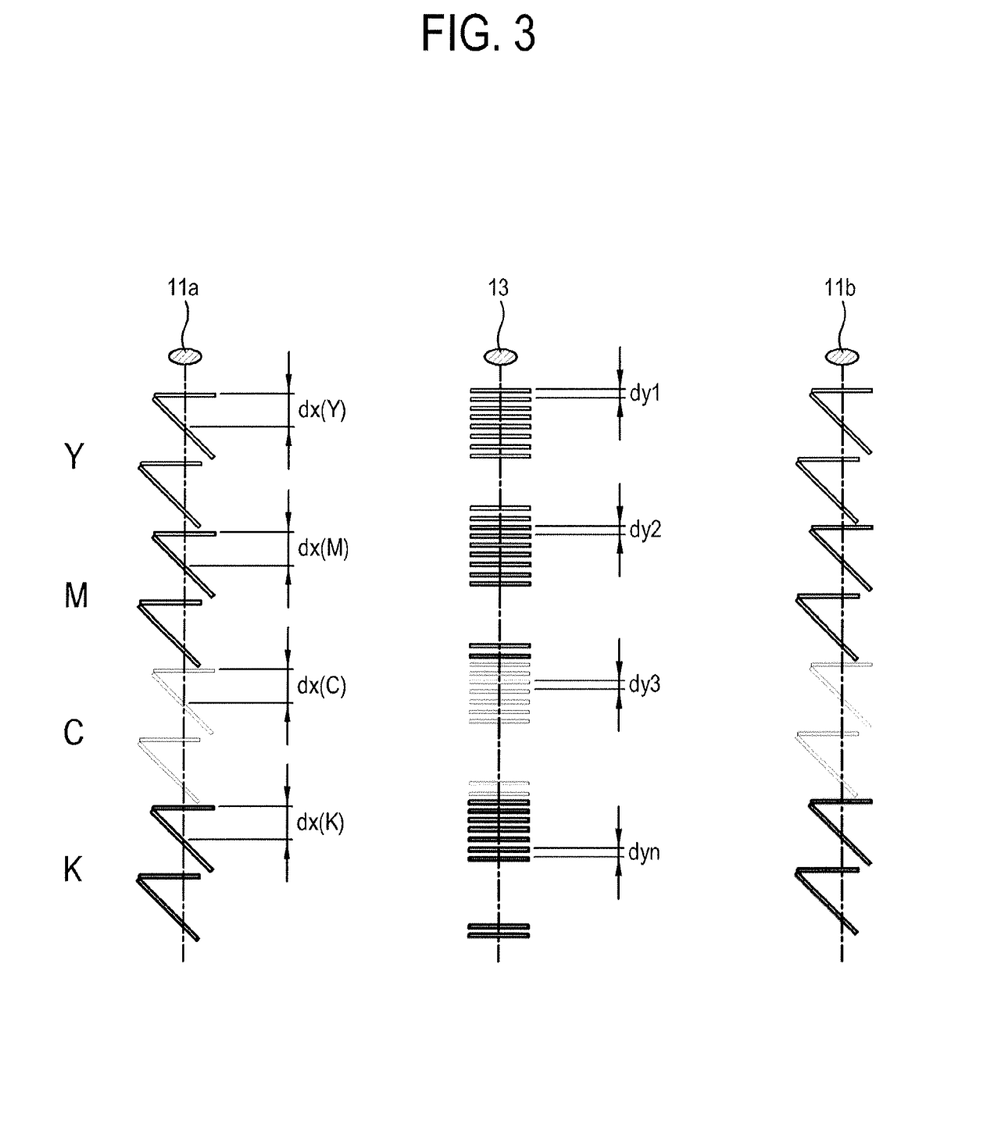
FIG. 3 illustrates a pattern transferred by the image forming apparatus according to exemplary embodiments of the present general inventive concept.

FIG. 3 illustrates a pattern transferred by the image forming apparatus 100 according to exemplary embodiments of the present general inventive concept.

As illustrated therein, the image forming apparatus 100 according to example embodiments of the present general inventive concept can transfer a first pattern 13 and second patterns 11a and 11b as patterns of an ACR. The first pattern 13 and the second patterns 11a and 11b may be transferred simultaneously or sequentially.

Hereinafter, the first pattern 13 is called an OPC pattern and the second patterns 11a and 11b are called ACR patterns.

The pattern and/or patterns (e.g., the OPC pattern and/or ACR patterns) can be symbols or characters.

As illustrated in FIG. 3, the ACR patterns 11a and 11b of the image forming apparatus 100 according to example embodiments of the present general inventive concept can be transferred a plurality of times. The ACR patterns 11a and 11b can include a bar pattern and a slant pattern spaced from each other at one end and contact each other at the other end. The OPC pattern can include a bar pattern which is transferred a plurality of times at predetermined intervals.

The controller 150 can control the image forming unit 120 to form the ACR patterns 11a and 11b and/or the OPC pattern 13, and/or transfer the ACR patterns 11a and 11b and the OPC pattern 13 on a surface of the transfer belt 111 corresponding to the plurality of colors including C, M, Y an K. When the patterns (e.g., the ACR patterns 11a and 11b, and the OPC pattern 13, etc.) are formed by the image forming unit 120 and transferred to a print medium, the detector 130 may be disposed to detect the patterns of the print media.

As illustrated in FIG. 2, the detector 130 can be provided in a moving path of the transfer belt 111 and can detect light reflected by the pattern. The detector 130 may include a plurality of light sensors including a light emitting unit and a light receiving unit.

Figure 4:
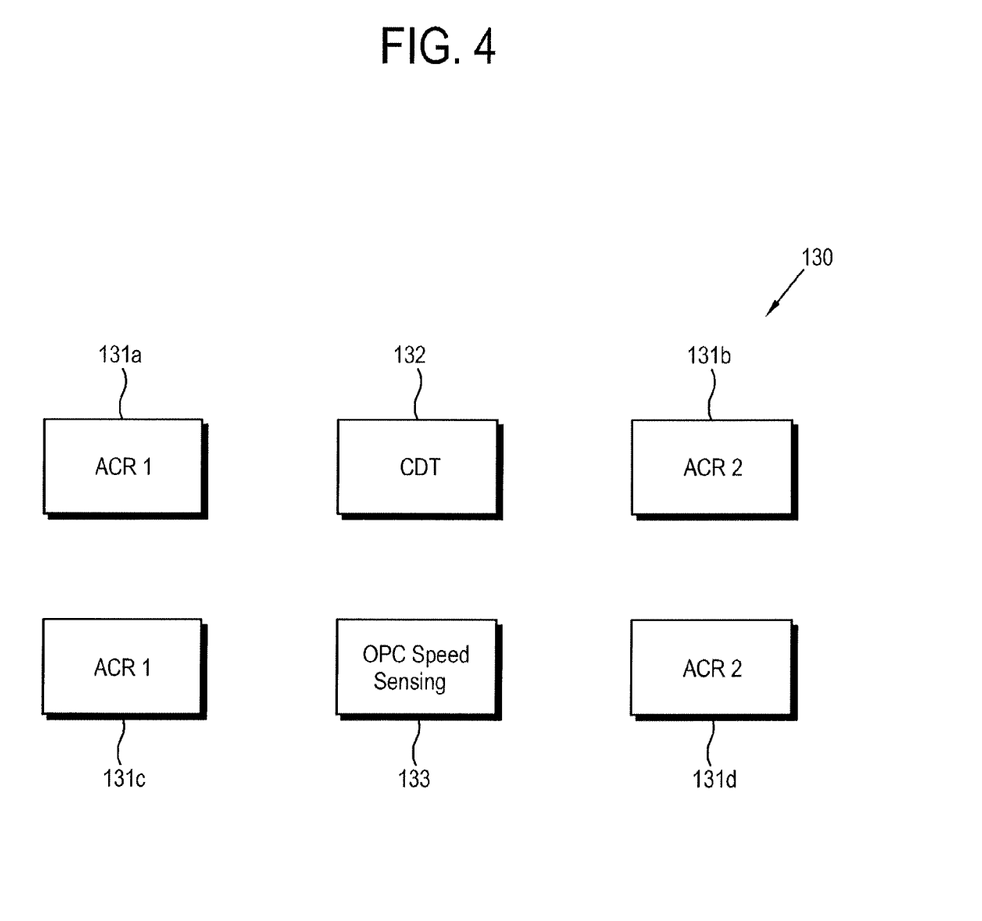
FIG. 4 is a block diagram illustrating a detector of the image forming apparatus according to exemplary embodiments of the present general inventive concept.

FIG. 4 is a block diagram illustrating the detector 130 of the image forming apparatus 100 according to exemplary embodiments of the present general inventive concept.

As illustrated therein, the detector 130 can include ACR sensors 131a to 131d as a plurality of light sensors detecting a plurality of patterns transferred to the transfer belt 111, a color tone detector (CTD) 132, and an image receptor sensor (hereinafter, to be also called "OPC speed sensor") 133.

The ACR sensors 131a to 131d can detect light reflected to the ACR patterns 11a and 11b transferred to the transfer belt 111. That is, the ACR sensors 131a to 131d can detect a starting point and an ending point of the transferred ACR patterns 11a and 11b as in FIG. 3 to output the detection result to the controller 150. The controller 150 can identify location information of the pattern by using at least one output value of the ACR sensors 131a to 131d and can perform the ACR according to at least the location information.

FIG. 3 illustrates only two ACR sensors for purposes of convenience. In example embodiments of the present general inventive concept, however, the image forming apparatus 100 can include four ACR sensors 131a to 131d as illustrated in FIG. 4, or any other suitable number of ACR sensors in order to carry out the example embodiments of the present general inventive concept described herein.

The CTD 132 can detect a density of the transferred pattern and can output a result value to the controller 150. The controller 150 can adjust the density according to at least the result value of the detected density.

The OPC speed sensor 133 can detect light reflected to the OPC pattern 13 transferred to the transfer belt 111. That is, the OPC speed sensor 133 can detect a starting point and an ending point of the transferred OPC pattern 13, and can output the detection result to the controller 150. The controller 150 can identify location information of the pattern by using the output value of the OPC speed sensor 133, and can control a driving speed of the OPCs 121a to 121d based on the location information.

Figure 5:
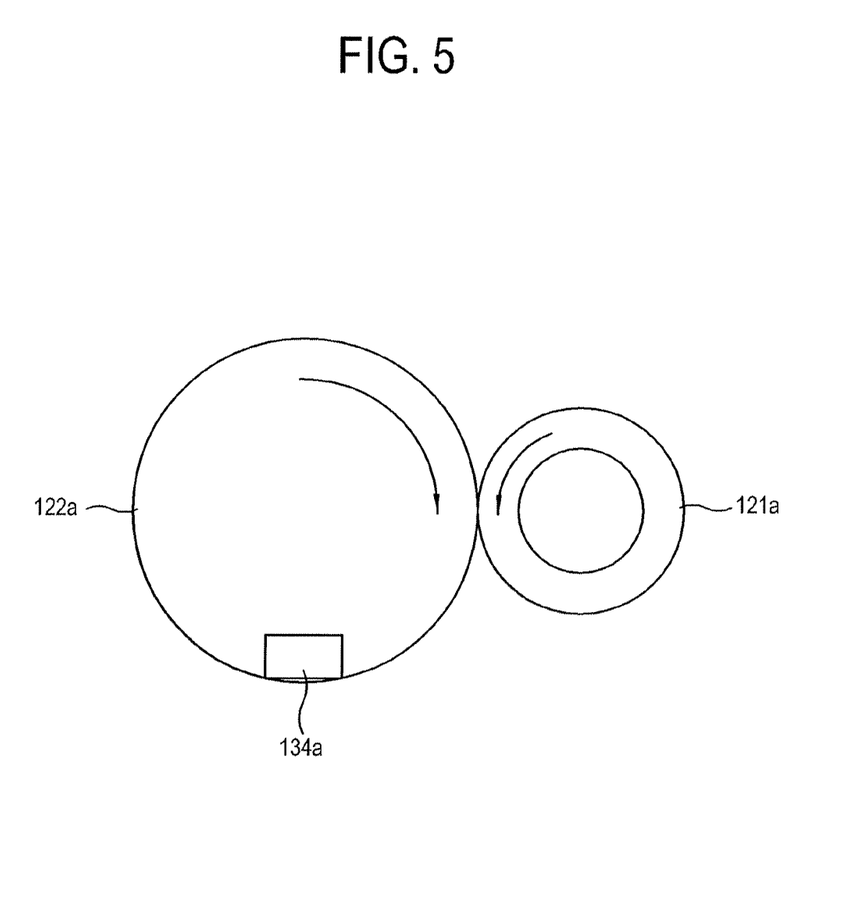
FIG. 5 illustrates one of the organized photo conductors (OPCS) and an OPC gear driving the OPC of the image forming apparatus according to exemplary embodiments of the present general inventive concept.

As illustrated in FIG. 5, the detector 130 may include an OPC sync sensor 134a.

FIG. 5 illustrates the OPC 121a and the OPC gear 122a can drive the OPC 121a of the image forming apparatus 100 according to exemplary embodiments of the present general inventive concept.

As illustrated therein, the OPC 121a can be engaged with the OPC gear 122a and can rotate by a rotation of the OPC gear 122, and transfers an electrostatic latent image to the transfer belt 111. The OPC gear 122a is connected to a motor (not illustrated) which supplies a rotational force.

The rotation speed of the motor can be controlled by a control signal of the controller 150.

FIG. 5 illustrates one OPC 121a of the OPCs and the OPC gear 122a can drive the OPC 121a. The image forming apparatus 100 according to the present general inventive concept can include a plurality of OPCs 121a to 121d, where each may have corresponding driving gear, respectively. The driving gear can be rotated by a corresponding motor.

The OPC sync sensor 134a can detect an OPC period of the OPC gear 122a.

More specifically, the controller 150 can detect a starting point of the OPC period of the OPC gear 122a through a sensing value of the OPC sync sensor 134a. That is, a unit of changing and reading the sensing value of the OPC sync sensor 134a can become an OPC period of the OPC gear 122a. The controller 150 may transfer the OPC pattern 13 to synchronize with a phase of the OPC gear 122a, i.e., a phase of the OPC 121a.

If the first pattern 13 and the second patterns 11a and 11b can be transferred simultaneously and/or about simultaneously, the ACR sensors 131a to 131d and the OPC speed sensor 133 may detect the patterns simultaneously (and/or about simultaneously) or detect the patterns at predetermined intervals. If the second patterns 11a and 11b and the first pattern 13 are individually transferred, the ACR sensors 131a to 131d and the OPC speed sensor 133 may detect the patterns according to the transfer of the patterns.

The detection result of the detector 130 can be transmitted to the controller 150. The controller 150 may perform the ACR with reference to the detection result. The ACR according to exemplary embodiments of the present general inventive concept can include a speed control of the motor to control the rotation speed at each block of the OPCs 121a to 121d.

The storage unit 140 can store therein print data corresponding to a print operation, and pattern data corresponding to the second patterns 11a and 11b and the first pattern 13. The image forming unit 120 can load the print data and the pattern data from the storage unit 140, and can perform the print operation and the ACR according to the print data and the pattern data.

The storage unit 140 can store therein reference data for a distance between the OPC patterns 13 (as described in detain below).

The storage unit 140 may store therein data on the ACR result performed by the image forming apparatus 100.

The storage unit 140 can include an internal storage medium such as a hard disk drive (HDD) or an external or portable storage medium such as a USB memory, and memory card (memory stick, CF card and MMC).

The controller 150 can control the image forming apparatus 100. The controller 150 according to exemplary embodiments of the present general inventive concept may include a central processing unit (CPU) and/or any suitable processor to carry out the exemplary embodiments of the present general inventive concept as described herein having software or executable instructions (and/or coupled to a memory or stage device having the software and/or executable instructions) such as a printer driver, a predetermined application, or firmware.

Figure 6:
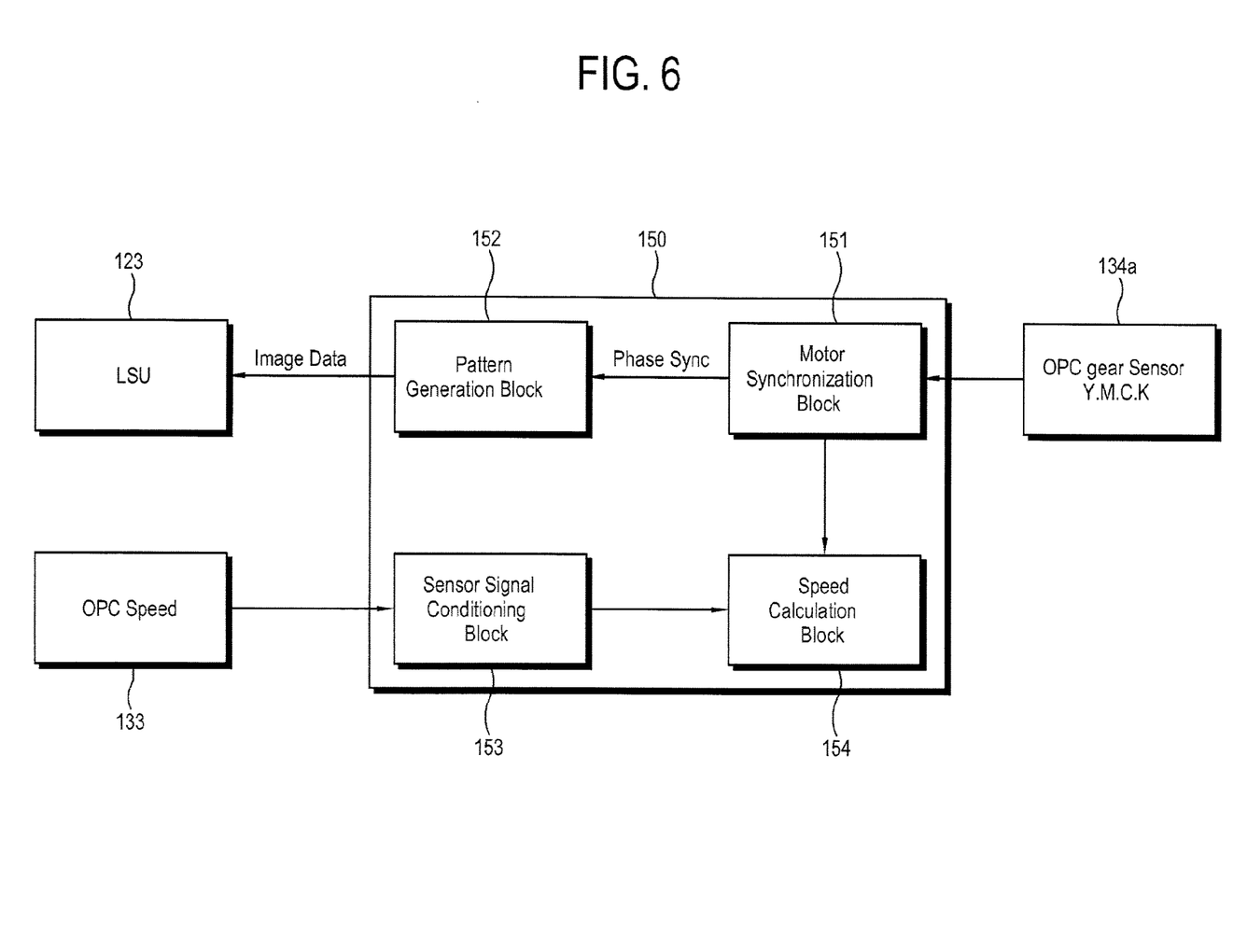
FIG. 6 is a block diagram illustrating a controller of the image forming apparatus according to exemplary embodiments of the present general inventive concept.
Figure 7:
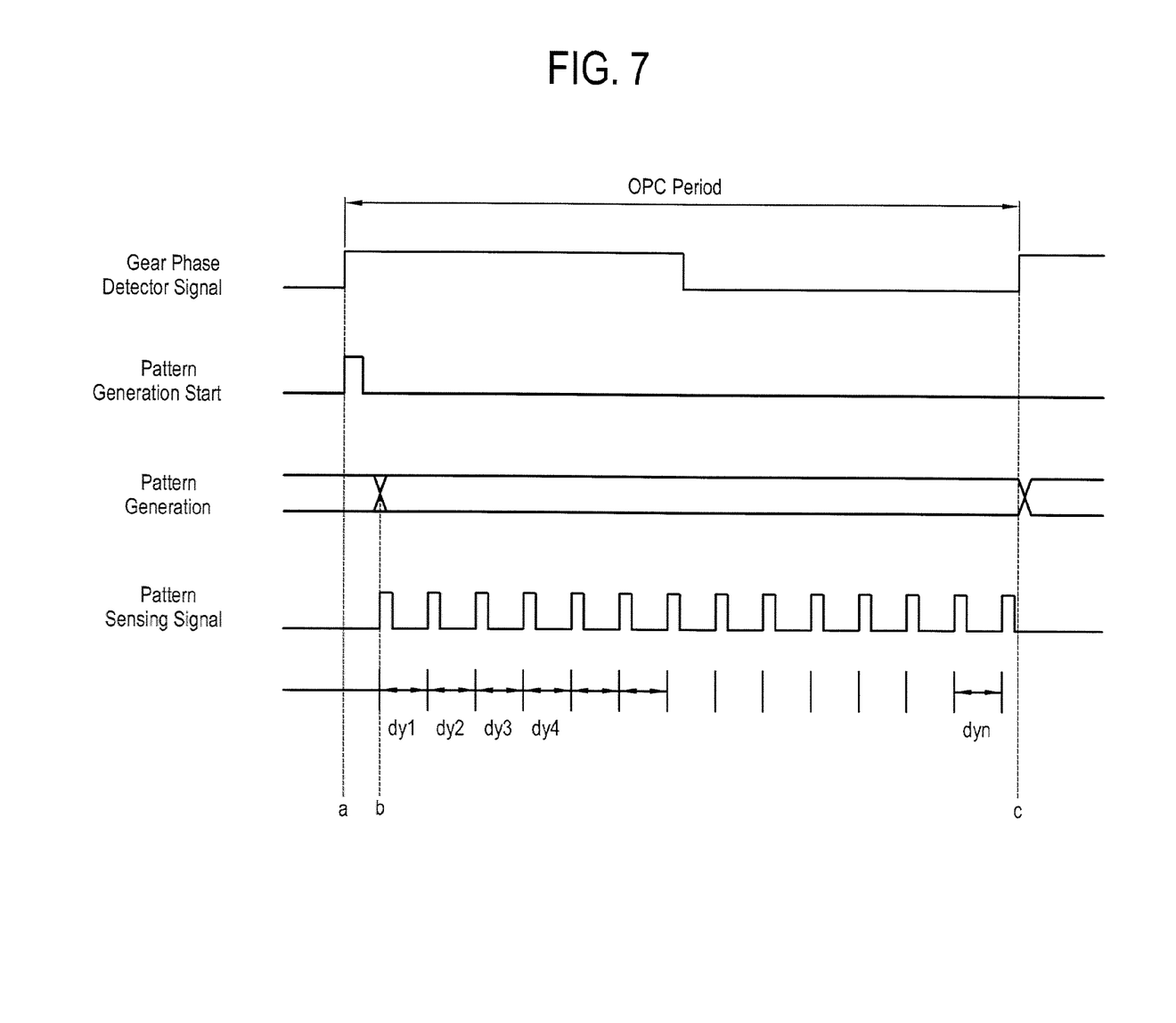
FIG. 7 is a graph illustrating a control signal according to exemplary embodiments of the present general inventive concept.

FIG. 6 is a block diagram of the controller 150 of the image forming apparatus 100 according to exemplary embodiments of the present general inventive concept. FIG. 7 is a graph that illustrates a control signal according to exemplary embodiments of the present general inventive concept.

As illustrated in FIG. 6, the controller 150 can include a motor synchronization block 151, a pattern generation block 152, a sensor signal conditioning block 153 and a speed calculation block 154.

The motor synchronization block 151 can detect a phase of the OPC gear 122a according to the sensing value of the OPC sync sensor 134a. That is, the OPC sync sensor 134a can detect and output a starting point of the OPC period of the OPC 121a. The motor synchronization block 151 may detect a phase of the OPC gear 122a according to the OPC period by at least using the output value of the OPC sync sensor 134a.

The motor synchronization block 151 may receive a sensing value of the OPC sync sensors 134a provided in each of the OPC gears of the plurality of OPCs 121a to 121d corresponding to Y, M, C and K.

A gear phase detector signal which can be detected from the motor synchronization block 151 can correspond to the OPC period of the OPCs 121a to 121d.

The pattern generation block 152 can output a signal to generate the OPC pattern 13, i.e. image data to the LSU 123 to synchronize with the OPC period of the OPCs 121a to 121d with reference to the gear phase detector signal detected from the motor synchronization block 151.

If a pattern generation signal can be generated at a timing a, which is a starting point of the OPC period for the OPC gear as in FIG. 7, a pattern generation signal, i.e., image data, can be output from a timing b delayed from the timing a for predetermined time to a timing c where a one-time rotation of the OPC gear is completed.

The image data can be output according to the rotation of the OPC gear 122a.

The plurality of LSUs 123a to 123d can scan light forming the OPC pattern 13 on the plurality of OPCs 121 according to the received image data to synchronize with the OPC period for the OPCs 121 (i.e., OPC period of the OPC driving gear 122a).

The pattern generation block 152 may output image data generating the ACR patterns 11a and 11b for the ACR. The plurality of LSUs 123a to 123d can scan light to form the ACR patterns 11a and 11b according to the received image data.

The image forming unit 120 may form the ACR patterns 11a and 11b and the OPC pattern 13 at the same time, different times, or at any suitable times in order to carry out the exemplary embodiments of the present general inventive concept, and transfer the patterns to the transfer belt 111.

The sensor signal conditioning block 153 can identify location information of the pattern by using, for example, the detection result of the OPC pattern 13 of the OPC speed sensor 133. That is, the sensor signal conditioning block 153 can detect the pattern sensing signal of the OPC speed sensor 133 as illustrated in FIG. 7.

The speed calculation block 154 can identify distances dy1, dy2, dy3, . . . and dy4 between the OPC patterns 13 by using at least the detected OPC pattern sensing signal, and can detect a change in the speed at each block between the OPC patterns 13 of the OPC gear 134a based on the distances dy1, dy2, dy3, . . . and dy4.

The speed calculation block 154 can compare the distance between the detected OPC patterns 13 and reference data on the distance between the OPC patterns 13 prestored in the storage unit 140, and can output a control signal to the motor supplying a rotational force to the OPC driving gear 134a.

The output control signal can control the driving speed at one or more blocks of the motor (e.g., each block of the motor, etc.) to maintain a consistent distance between the OPC patterns 13 (e.g., to minimize the variation in distance between the detected OPC patterns 13). That is, output control signal can control the driving speed of the one or more blocks of the motor such that the distance between OPC patterns 13 is equal to or about equal to the distance between patterns of the reference data stored in the storage unit 140.

The controller 150 can control the image forming unit 120 to transfer the OPC patterns 13 that are synchronized with the phase of the OPCs 121a to 121d corresponding to the plurality of colors, and can detect the distances dy1, dy2, dy3, . . . and dyn between the OPC patterns 13 through the detector 130, and can control the speed at one or more blocks (e.g., each block, etc.) corresponding to the distance between the OPC patterns 13 to maintain a consistent distance between the OPC patterns 13 (e.g., to minimize the variation in distance between the OPC patterns 13). That is, output control signal can control the driving speed of the one or more blocks of the motor such that the distance between OPC patterns 13 is equal to or about equal to the distance between patterns of the reference data stored in the storage unit 140.

As the driving speed of the motor at the one or more blocks (e.g. each block) of the OPCs 121a to 121d is controlled, accuracy of the ACR may be improved.

The controller 150 can detect the plurality of ACR patterns 11a and 11b transferred to the transfer belt 111 corresponding to the plurality of colors, and can perform the ACR with respect to a color which is out of the registration position.

More specifically, the controller 150 can measure a Y offset by using a distance between the bar patterns of the ACR patterns 11a and 11b of the reference color (e.g., K) and other colors (e.g., C, M and Y), and can adjust the measured Y offset.

The controller 150 can measure the X offset by using the distances Dx(Y), Dx(C) and Dx(K) between the bar pattern and the slant pattern detected per color, and can adjust the measured X offset.

Accordingly, the controller 150 can perform the ACR to register the position of the ACR patterns 11a and 11b with respect to the plurality of colors through adjustment of the X offset and the Y offset.

The controller 150 may perform the ACR by controlling a light beam scanning period of the plurality of LSUs 123a to 123d corresponding to the plurality of colors according to the plurality of detected second patterns (ACR patterns) 11a and 11b.

The controller 150 of the image forming apparatus 100 according to exemplary embodiments of the present general inventive concept may control the detector 130 to detect the ACR patterns 11a and 11b and the OPC pattern 13 transferred to the transfer belt 111, and may sequentially perform the ACR through the ACR patterns 11a and 11b and may perform the ACR (speed control of the motor) through the OPC pattern 13.

The controller 150 may sequentially perform the ACR (speed control of the motor) through the OPC pattern 13 and the ACR through the ACR patterns 11a and 11b.

The automatic color registration method of the image forming apparatus 100 according to exemplary embodiments of the present general inventive concept can transfer the pattern synchronized with the phase of the OPC as well as the pattern for a general ACR, and can control the driving speed of the OPC through the transferred pattern to thereby increase reliability of the ACR result.

According to exemplary embodiments of the present general inventive concept, the second patterns 11a and 11b and the first pattern 13 can be transferred to the transfer belt 111. The second patterns 11a and 11b or the first pattern 13 may be transferred to a record medium.

Figure 8:
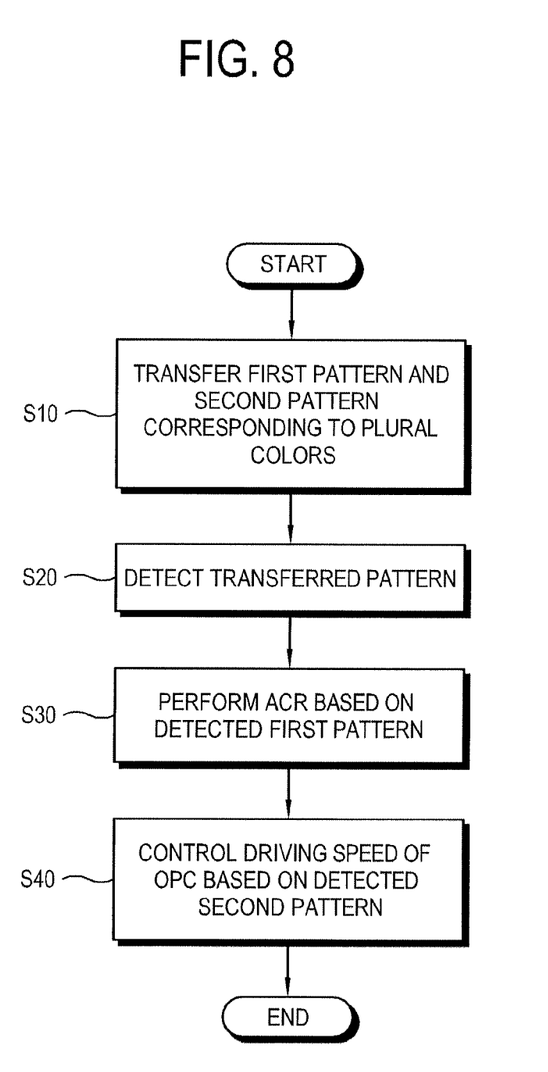
FIG. 8 is a flowchart illustrating an auto color registration method of the image forming apparatus according to exemplary embodiments of the present general inventive concept.

Hereinafter, the automatic color registration process of the image forming apparatus 100 having the foregoing configuration will be described with reference to FIG. 8.

The controller 150 can control the image forming unit 120 to form the first pattern 13 and the second patterns 11a and 11b at least one time corresponding to the plurality of colors by transferring a developer on a surface of the transfer belt 111 at operation S10. The first pattern 13 and the second patterns 11a and 11b may correspond to the C, M, Y and K, and may correspond to at least four colors according to the colors of the image forming unit 120. The first pattern 13 and the second patterns 11a and 11b may be transferred simultaneously or sequentially.

The first pattern 13 which is transferred at operation S10, i.e., the OPC pattern 13, may include a pattern synchronized with the phase of the image receptor i.e., OPC.

The detector 130 can detect the transferred second patterns 11a and 11b and the first pattern 13 at operation S20. The detector 130 may measure the distance between the patterns by detecting the light reflected to the transferred second patterns 11a and 22b and the first pattern 13.

The controller 150 can perform the ACR adjusting the X offset and the Y offset according to the detected second patterns 11a and 11b at operation S30. The controller 150 may control the light beam scanning period of the plurality of exposure units i.e., LSUs 123a to 123d, corresponding to the plurality of colors according to the second patterns 11a and 11b detected at operation S20 to perform the ACR.

At operation S40, the controller 150 can perform the ACR controlling the driving speed of the image receptors i.e., OPCs 121a to 121d to maintain a consistent distance between the patterns (i.e., minimize the variation of the distance between the patterns) according to the first pattern 13 detected at operation S20.

According to exemplary embodiments of the present general inventive concept, the ACR (control of the light beam period) can be performed through the ACR patterns 11a and 11b at operation S30, and the ACR (speed control of the motor) can be performed through the OPC pattern 13 at operation S40. The image forming apparatus 100 according to the present general inventive concept may perform the operation S40 first and then the operation S30.

As described above, the image forming apparatus 100 and the automatic color registration method thereof according to the present general inventive concept can control the speed of the rotating motor other than the ACR by a conventional electrical control to thereby minimize jitter, slip, and weaving of the transfer belt adversely affecting the accuracy of the ACR and improve the ACR accuracy.

As described above, an image forming apparatus and an automatic color registration method thereof according to the present general inventive concept can control a driving speed of an OPC by using a pattern synchronized with a phase of the OPC and improves accuracy of the ACR.

Also, the image forming apparatus and the automatic color registration method thereof according to the present invention minimizes jitter, slip, and weaving of the transfer belt adversely affecting accuracy of the ACR to thereby improve reliability of the ACR.

Although several exemplary embodiments of the present invention have been illustrated and described, it will be appreciated by those skilled in the art that changes may be made in these exemplary embodiments without departing from the principles and spirit of the invention, the scope of which is defined in the appended claims and their equivalents.

What is claimed is:

1. An automatic color registration method of an image forming apparatus, the method comprising:
   transferring a plurality of first patterns synchronized with a phase of an image receptor, the first patterns being photoconductor patterns, and transferring a second pattern having a bar pattern and a slant pattern which are spaced from each other at one end and contact each other at the other end, the second pattern being an auto color registration pattern;
   detecting the transferred first patterns and the transferred second pattern; and
   controlling a driving speed of the image receptor based on the detected first pattern.

2. The method according to claim 1, wherein the controlling the driving speed of the image receptor comprises:
   controlling a driving speed at one or more blocks of the image receptor to maintain a distance between the plurality of first patterns.

3. The method according to claim 1, wherein:
   the detecting the transferred first patterns comprises comparing the distance between the plurality of first patterns and reference data; and
   the controlling the driving speed of the image receptor comprises controlling a driving speed at the one or more blocks of the image receptor to make the distance between the first patterns be equal to that of the reference data.

4. The method according to claim 1, wherein the transferred first patterns comprise a plurality of bar patterns.

5. The method according to claim 1, wherein the transferring the first patterns comprises transferring the second pattern a plurality of times corresponding to a predetermined color.

6. The method according to claim 5, further comprising:
   controlling a scanning period of a plurality of exposure units corresponding to the plurality of colors based on the second pattern.

7. The method according to claim 5, further comprising measuring an X offset and an Y offset by using a distance between the second patterns,
   wherein the controlling the scanning period of the plurality of exposure units comprises performing an automatic color registration (ACR) to register a position of the second patterns with respect to the plurality of colors by using the measured X offset and the Y offset.

8. The method according to claim 7, wherein the first and second patterns are transferred corresponding to colors of cyan (C), magenta (M), yellow (Y) and black (K).

9. An image forming apparatus, comprising:
   a moving unit having a transfer belt;
   an image forming unit having a plurality of image receptors to transfer first patterns to the transfer belt corresponding to a plurality of colors, the first patterns being photoconductor patterns, and to transfer second patterns a plurality of times, the second patterns comprising a bar pattern and a slant pattern which are spaced from each other at one end and contact each other at the other end, the second patterns being an auto color registration pattern;
   a detector having an image receptor speed sensor to detect the transferred first pattern and the transferred second patterns, and an image receptor sync sensor to detect a phase of the image receptor; and
   a controller to control the image receptors to transfer the plurality of first patterns synchronized with the phase of the image receptors according to a detection result of the image receptor sync sensor, and to control a driving speed of the image receptors based on the detected first pattern.

10. The image forming apparatus according to claim 9, wherein the controller controls a driving speed at one or more blocks of the image receptors to maintain a distance between the plurality of first patterns.

11. The image forming apparatus according to claim 9, further comprising a storage unit to store therein reference data on the distance between the plurality of first patterns, wherein
    the controller compares the detected distance between the plurality of first patterns, and controls a driving speed at the one or more blocks of the image receptors to make the distance between the first patterns be equal to that of the reference data.

12. The image forming apparatus according to claim 9, wherein the first patterns comprise a plurality of bar patterns.

13. The image forming apparatus according to claim 9, wherein the image receptors transfer the second patterns a plurality of times corresponding to a predetermined color, and the detector further comprises an ACR sensor to detect the transferred second pattern.

14. The image forming apparatus according to claim 13, wherein the image forming unit comprises a plurality of exposure units corresponding to the plurality of colors, and the controller controls a scanning period of the plurality of exposure units according to the second patterns.

15. The image forming apparatus according to claim 13, wherein the controller measures an X offset and an Y offset by using a distance between the detected second patterns, and performs an automatic color registration (ACR) to register a position of the second patterns with respect to a plurality of colors by using the measured X offset and the Y offset.

16. The image forming apparatus according to claim 15, wherein the first patterns and the second patterns are transferred corresponding to colors of cyan (C), magenta (M), yellow (Y) and black (K).

17. A method of performing automatic color registration (ACR) in an image forming apparatus, the method comprising:
    synchronizing a phase of an organized photoconductor with at least one first pattern being a photoconductor pattern, and second patterns comprising a bar pattern and a slant pattern which are spaced from each other at one end and contact each other at the other end, the second patterns being an auto color registration pattern; and
    controlling the driving speed of the organized photoconductor in the image forming apparatus with the at least one first pattern and the second patterns that are synchronized with the phase.

18. The method of claim 17, wherein the controlling the driving speed comprises:
    controlling the driving speed at one or more blocks of the organized photoconductor to maintain a distance between the patterns.

19. The method of claim 17, wherein the at least one pattern is detected with a detector of the image forming apparatus.

20. The method according to claim 19, wherein the at least one pattern is detected by comparing the distance between the patterns and reference data.

21. The method of claim 20, wherein the controlling the driving speed comprises:
controlling the driving speed at the one or more blocks of the organized photoconductor such that the distance between the patterns is equal to that of the reference data.

22. The method according to claim 17, wherein the at least one pattern is a bar pattern.

23. The method according to claim 17, further comprising:
detecting at least one pattern that corresponds to a predetermined color with a detector of the image forming apparatus.

24. The method according to claim 23, further comprising:
controlling a scanning period of a plurality of exposure units of the image forming apparatus corresponding to the detected at least one pattern corresponding to the predetermined color.

25. An image forming apparatus, comprising:
a controller to synchronize a phase of an organized photoconductor with at least one first pattern being a photoconductor pattern, and a second pattern having a bar pattern and a slant pattern which are spaced from each other at one end and contact each other at the other end, the second pattern being an auto color registration pattern, and to control the driving speed of the organized photoconductor in the image forming apparatus with the at least one first pattern and the second pattern that are synchronized with the phase.

26. An image forming apparatus, comprising:
an image forming unit to form a first pattern and a second pattern, the first pattern being a photoconductor pattern, and the second pattern being an auto color registration pattern comprising a bar pattern and a slant pattern which are spaced from each other at one end and contact each other at the other end;
a detector to detect the first pattern and the second pattern; and
a controller to control different characteristics of the image forming unit according to the detected first pattern and the detected second pattern, the different characteristics including a speed of an image receptor and scanning a period of an exposure unit.

27. The apparatus of claim 26, wherein the image forming unit comprises the image receptor and the exposure unit.

* * * * *